United States Patent [19]
Espig

[11] 4,012,751
[45] Mar. 15, 1977

[54] PHOTOGRAPHIC CAMERA WITH ELECTROMAGNETIC ACTUATOR OF THE SHUTTER SEGMENTS

[75] Inventor: Winfried Espig, Calmbach, Germany

[73] Assignee: Prontor-Werk Alfred Gauthier GmbH, Postfach, Germany

[22] Filed: May 29, 1975

[21] Appl. No.: 582,067

Related U.S. Application Data

[63] Continuation of Ser. No. 511,901, Oct. 3, 1974, abandoned, which is a continuation of Ser. No. 335,585, Feb. 26, 1973, abandoned, which is a continuation of Ser. No. 141,784, May 10, 1971, abandoned.

[30] Foreign Application Priority Data

May 8, 1970 Germany .......................... 2022532

[52] U.S. Cl. .............................. 354/234; 354/29; 354/60 R; 354/235; 361/159
[51] Int. Cl.² .......................................... G03B 9/08
[58] Field of Search ............. 354/29, 50, 51, 60 R, 354/230, 234, 235; 317/DIG. 6

[56] References Cited
UNITED STATES PATENTS

| | | |
|---|---|---|
| 3,205,412 | 9/1965 | Winston ........................ 317/DIG. 6 |
| 3,396,314 | 8/1968 | Corson et al. ................. 317/DIG. 6 |
| 3,411,045 | 11/1968 | Reyner .......................... 317/DIG. 6 |
| 3,466,993 | 9/1969 | Fahlenberg et al. ............... 354/230 |
| 3,511,157 | 5/1970 | Eloranta ............................ 354/230 |
| 3,791,278 | 2/1974 | Riber et al. ........................ 354/235 |

*Primary Examiner*—Russell E. Adams, Jr.
*Attorney, Agent, or Firm*—Arthur A. March

[57] ABSTRACT

A photographic camera shutter is moved to open and returned to its closed position by electromagnetic actuating means. A special electronic circuit is connected with said actuating means to energize the electromagnetic device with sufficient potential to cause a smooth and rapid opening movement which then decreases to a lower potential during the time interval that the shutter is to be maintained in its open position.

4 Claims, 3 Drawing Figures

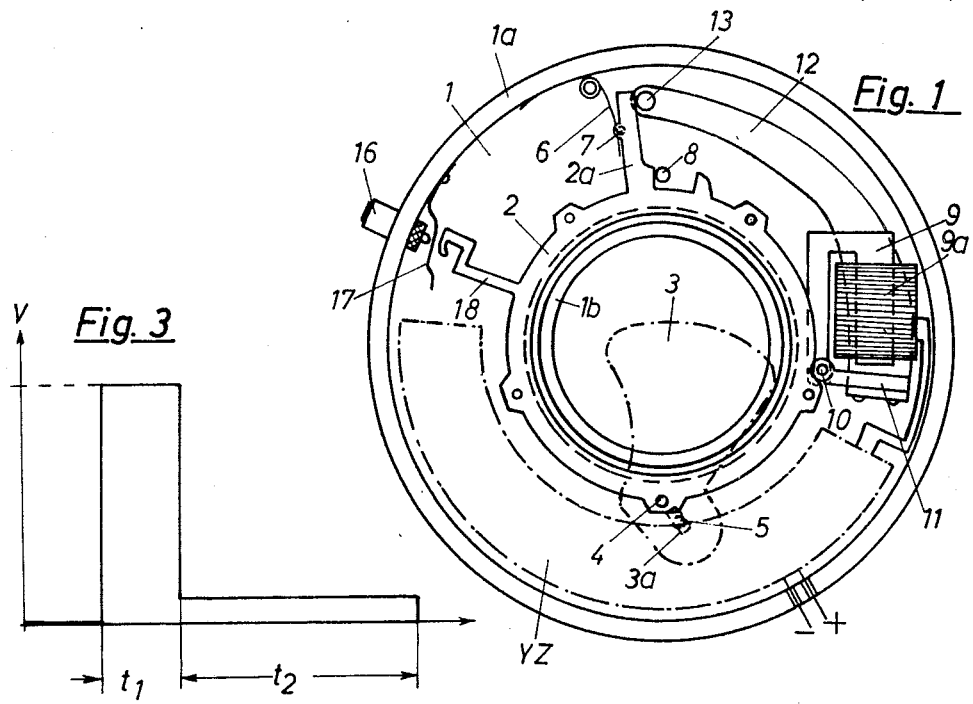
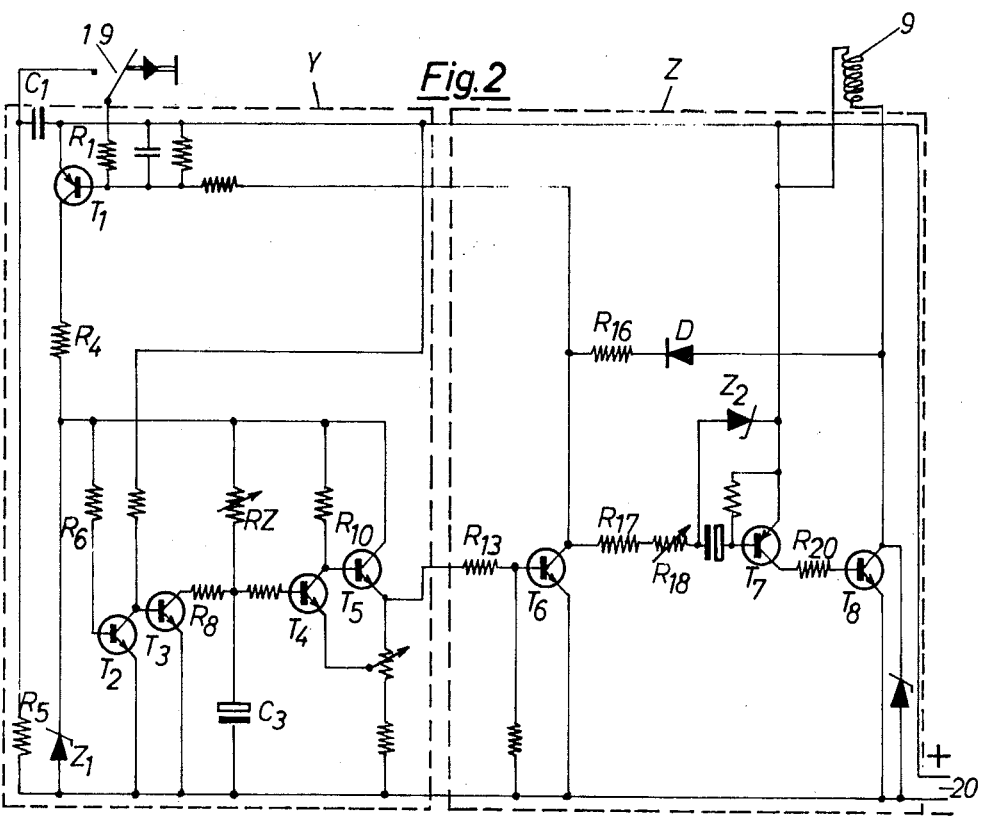

PHOTOGRAPHIC CAMERA WITH ELECTROMAGNETIC ACTUATOR OF THE SHUTTER SEGMENTS

This is a continuation in turn of copending U.S. applications: Ser. No. 511,901 filed Oct. 3, 1974; Ser. No. 335,585, filed Feb. 26, 1973; and Ser. No. 141,784, filed May 10, 1971; respectively now abandoned.

The invention relates to a photographic camera with a shutter, whose segment system is movable to an open position by means of an electromagnetic actuator and which can be maintained in this position by an operating winding under pressure for a certain time interval controlled by an electronic time determining arrangement.

In cameras of the above type, whose segment system is actuated by an electronic magnet, it is important that the starting energization of the magnetic coil, when it is desired to achieve an opening movement of the segments with a rapidly increasing aperture, is so constructed that a fast and reliable tightening of the magnet anchor to the pole piece is achieved. This, however, requires the use of a powerful electromagnet. Due to the relatively large size of the coil, on the one hand, and the limited space in the housing of a shutter, on the other hand, such magnet systems as are available, are not suitable for the intended purpose. Magnet systems of smaller dimensions, which could be built into the shutter housing, have, however, proved to be too weak to pull the anchor over the air space necessarily existing between the same and the magnet pole, as well as against the influence of a return spring. In addition, operating windings of smaller magnets do not lend themselves to be held under stress for longer time intervals, during which they are supposed to hold the shutter system in open position, without exposing the same to the danger of overstraining. In order to protect the operating winding from such overstraining, which could lead to its destruction, it was determined to actuate the magnet, after the opening of the segments has been effected, with only as much energy as is necessary to hold the magnet anchor, which may be much less than the starting energization.

In a known manner this was achieved by de-energizing a condenser, already charged, over a resistor, before releasing the shutter, by actuating the release button of the camera over the winding, which is parallel to the condenser, whereby a high current necessary for energization is obtained. This energization, determined by the magnitude of the condenser and the inner resistance of the winding, constantly decreases after an exponential function. Thereby, also the stress in the condenser and in the winding is reduced, until finally the voltage obtained by the series connection of resistor and winding is achieved. The now flowing constant lower energizing current is sufficient to securely hold the magnet anchor during the time the shutter is open.

This known arrangement has, however, another disadvantage, namely that the condenser, due to the small inner resistance of the winding and the mechanical time constant of the segment system, must be relatively large and, consequently, cannot be built into either the housing of a shutter of known construction or in the housing of a time control means adapted for regular handling. Besides, the energization which constantly decreases during the opening movement of the segment system, subject to the decreasing energization of the condenser, has an adverse effect on the opening velocity of the shutter.

It is the object of this invention to create an electromagnetic segment actuator which, when using a small electromagnet, as well as a condenser suitable for placing in the housing of a shutter or in the housing of a means serving the time control of a camera, provides a fast and reliable starting of the magnet anchor. In addition, using the present arrangement, excess stresses of the winding and the resulting danger of the destruction of the same, cannot occur, even if the anchor has to be energized over a longer time period, as for example by taking photographs with ultralong exposure times.

According to this invention a voltage, constant in its amplitude and controllable in its duration of effect, is lead to the winding of the electromagnet during opening movement of the segment system over a special electronic switch which is attached to the electronic time control arrangement. The voltage creates in the winding a current flow of a magnitude which is required for reaching a maximum initial energization, while, thereafter, by way of the circuit arrangement, the energization is reduced to a substantially lower constant value, but one sufficient to keep the segment system open. Thereby, the requirements for an electromagnetic system for cameras are fulfilled in an optimum manner. Using this special control circuit, due to constant voltage in the winding. The fundamental conditions could be met for the first time. This invention makes it possible to provide for a condenser and an electromagnet to be built into the housing of a shutter or a conventional time control apparatus. This is done under simultaneous guarantee of such high voltage of the electromagnet so that the anchor may be energized with the speed and reliability required by cameras. This energization may be reduced to a value which protects the winding holding the anchor against overcharging and danger of destruction.

It is further suggested that the electronic circuit include a condenser which determines the duration of time during which the energy source relays the complete voltage to the winding and which is connected to the base of a transistor. The transistor, in turn, is actuated during energization by the charging current of the condenser in the overload range. Moreover, for the purpose of achieving a rapid voltage decrease in the winding of the electromagnet in the circuit, a Zener diode, connected to the negative pole of the condenser is provided. Thus when the diode responds, the diode changes from non-conductive to conductive state and thereby terminates energization of the condenser, which leads to blocking of the transistor.

Finally, according to another feature of the invention, it is proposed that the entrance of the special electronic circuit is connected over a resistor with the exit of the circuit of the electronic time control arrangement on the emitter of one of the transistors of this circuit.

By way of example, one embodiment of the invention is illustrated in the drawing, in which:

FIG. 1 shows a shutter with an electromagnetic actuator of the segments, of which, for the sake of a simpler illustration, only one is indicated in dash-dotted lines;

FIG. 2 shows a circuit diagram of an electronic shutter exposure time determining arrangement with a special electronic circuit for keeping the voltage in the winding of an electromagnet constant, when energizing the anchor, as well as for reducing the voltage to a constant value after the anchor is arranged on the electromagnet, and finally FIG. 3 is a diagram which illustrates the difference in voltage of the winding of the magnet system within the two time intervals $t_1$ (energization of the anchor) and $t_2$ (anchor energized).

In FIG. 1, the shutter housing 1, formed of a cylindrical capsule, is shown. On the outside there is a wall, 1a, and on the inside a central lens tube 1b, on which a ring 2, serving actuation of the segments, is pivotably arranged. The segments 3, of which, for the sake of simplicity, only one is shown in dash-dotted lines, are connected by way of a pin 4 to the annular segment actuator 2. Furthermore, the segments 3, in a manner not shown (like segments 3a), are pivotably arranged on a plate to be placed from above on the capsule by way of a pin-slit connection 5.

As illustrated in the drawing, the segment actuating ring 2 is provided with a radially directed arm 2a, on which a return spring 6, arranged in the shutter housing 1, formed by way of example of a leaf spring, becomes active, which, on the one hand rests on a pin 7 and attempts to maintain the ring 2 on a pin 8, holding ring 2 in its initial position.

To actuate ring 2 and thereby segments 3, an electromagnet 9, arranged in the ring space of the shutter housing 1, is used, to which an anchor 11, pivotably arranged around a pin 10, is provided. Fixedly connected with the anchor there is a crescent-shaped power transfer device 12, provided on its free end with a pin 13 which, in turn, acts on arm 2a of the segment actuator 2. As soon as a magnetic field is obtained in electromagnet 9, the winding 9a of the magnet energizes anchor 11, whereby the crescent-shaped lever 12 performs a pivotal movement around pin 10 and thereby pushes arm 2a of segment actuator 2. As a result, segments 3 change from closed to open position. The segments 3 are kept in open position by maintaining the magnetic field in electromagnet 9, whereby a flip-flop circuit, known per se, controllable either by a photoresistance or an adjustable resistance (shown in dashes in FIG. 2 in the circuit Y), determines the time interval, during which the anchor 11 is maintained in energized position on electromagnet 9. At the end of the time interval, electromagnet 9 again de-energizes anchor 11, whereupon segments 3, under the influence of the return spring 6, return to their closed position shown in FIG. 1, and the crescent-shaped power transfer means 12 returns to its initial position, corresponding to above position of the segments. For taking flash-light pictures, a flash-light socket 16 may be arranged in the housing 1a of the shutter, which has a contact spring 17, provided in the path of movement of a contact member 18, radially extending from the segment actuator 2.

As shown in dashes in FIG. 2, a special electronic circuit Z is provided, adjoining circuit Y, whose task is to induce the winding 9a of the electromagnet, when closing a starting switch 19, controllable by the release system of the camera, to cause a maximum energization of the anchor 11. Then, after energization of the anchor, to reduce the voltage in the winding 9a, so that in the winding there is a substantially lower current, just sufficient to maintain the anchor energized.

With respect to the construction and function of the two electronic switches, it should be noted that these are so chosen that, for instance, when actuating the release means of a camera, the starting switch 19 closes, whereby the charging of condenser $C_1$, energized over a resistor $R_5$, decreases over a resistor $R_1$, as well as over the base emitter path of a transistor $T_1$. Consequently, transistor $T_1$ is conductive. The emitter potential of transistor $T_1$ reaches a Zener diode $Z_1$ over resistor $R_4$. The voltage stabilized by this diode is then switched to the base resistor $R_6$ of transistor $T_2$, further to a resistor RZ (photo-resistor), serving the focusing or regulating of a certain time interval, to the collector resistor $R_{10}$ of a transistor $T_4$, as well as to the collector of transistor $T_5$. The transistor $T_2$ is now conducted over resistor $R_6$ which, in turn, blocks transistor $T_3$, so that condenser $C_3$ starts to be energized over resistor RZ. At this point, transistor $T_4$ still remains blocked, whereas transistors $T_5$ and $T_6$, connected over resistor $R_{13}$, are conductive. Due to the voltage current of condenser $C_4$ flowing into the base of transistor $T_7$ over the emitter collector path of transistor $T_6$, resistor $R_{17}$ and the regulatable resistor $R_{18}$, transistor $T_4$ is finally conductive. The current flowing over resistor $R_{20}$ into the base of transistor $T_8$, in its turn, now makes the same conductive. The winding of magnet 9 in the collector circuit of transistor $T_8$ now receives the full voltage of the energy source 20 over a time interval $t_1$ (FIG. 3), depending on the adjustment of resistor $R^{18}$, whereby the magnet anchor 11 is immediately energized and the shutter opened. In order to achieve a fast and reliable energization of the magnet anchor, the voltage of an energy source of 25 to 30 volts is sufficient. The necessary energy may be provided either by batteries or an electric circuit.

In an advantageous manner the resistor $R^{18}$ in the special electronic circuit is arranged in a manner that condenser $C_4$, when the open position of the segments 3 is achieved, is energized to the voltage at which the Zener diode $Z_2$ responds. Thereafter, a further energization of condenser $C_4$ is abruptly interrupted and, as a consequence, transistors $T_7$ and $T_8$ are blocked. Since the circuit Z is arranged in a manner so that transistor $T_7$, during energization of condenser $C_4$, until a voltage is achieved at which the diode $Z_2$ responds, remains in the overload range, the high voltage on winding 9a remains constant, until disconnecting transistor $T_8$. After disconnecting transistor $T_8$, the winding 9a receives, for the duration of the aperture time $t_2$ (FIG. 3) of the shutter, over the conductive transistor $T_6$, resistor $R_{16}$ and diode D, a voltage which is essentially lower by the amount of the voltage decrease appearing on resistor $R^{16}$, than the voltage of energy source 20. This voltage is in the range of about 10 to 15 percent of the maximum voltage of the energy source.

When the voltage on condenser $C_3$ reaches the switching threshold of the response stage (circuit Y), comprising transistors $T_4$ and $T_5$, it changes, that is transistor $T_4$ becomes conductive, whereas transistor $T_5$ becomes blocked. Also transistor $T_6$ is blocked thereby and, consequently, the energy supply to winding 9a is interrupted, so that the energization of the magnet anchor decreases and the shutter closes. Simultaneously, transistor $T_1$ loses its conductiveness, which was maintained during the open position of segments 3 over resistor $R_3$ connected to the collector of transistor $T_6$. Thereby, the voltage on the Zener diode $Z_1$ decreases, whereby transistor $T_2$ blocks and transistor $T_3$ conducts, and whereby the condenser $C_3$ is de-energized over its emitter-collector span as well as over resistor $R_8$. In this manner, the initial position of the electronic circuits Y and Z, as it was before actuating the starting switch 19, is again established. The other elements, not fully disclosed in FIG. 2 serve to complete the circuits.

I claim:

1. Photographic camera shutter comprising
   a segmented shutter system movable to open position for a determined shutter time interval and then back to closed position;
   electromagnetic actuator means operatively arranged to actuate said shutter system and having an electromagnet winding energizable at an initial maximum high magnitude constant voltage sufficient for moving said shutter system to open position and immediately thereafter energizable at a sustaining substantially lower magnitude constant voltage sufficient for maintaining said shutter system in said open position during the remainder of the determined shutter time interval that said winding is energized and in turn said shutter system remains open and thereby preventing voltage overload of said winding during said remainder of said shutter time interval;
   electronic time setting means for controlling the shutter time interval during which said winding is energized and in turn said shutter system remains open; and
   energizable circuit means for said time setting means and said winding and including an electronic switch circuit electrically coupled with said time setting means for providing in regulated time duration sequence the initial high constant voltage and immediately thereafter the sustaining lower constant voltage for energizing said winding within the determined shutter time interval controlled by said time setting means.

2. Photographic camera shutter according to claim 1 wherein said switch circuit includes a condenser for regulating the time duration during which said winding is energized at the initial high constant voltage, a transistor for controlling the voltage supply to said winding, means for connecting said condenser to the base of said transistor for activation thereof in the voltage overload range corresponding to energization at said initial maximum high constant voltage, and a Zener diode connected to the negative pole of said condenser and responsive for obtaining a rapid decrease in voltage through said winding, said condenser being responsive for changing from conductive to nonconductive state at the voltage at which said diode responds thereupon to cause said condenser to become deenergized and said transistor to become blocked.

3. Photographic camera shutter according to claim 2 wherein said circuit means includes a time setting circuit for said time setting means containing a transistor having an emitter and wherein a resistor is interconnectingly provided between said time setting circuit and said switch circuit and connected to the emitter of said transistor of said time setting circuit.

4. Photographic camera shutter according to claim 3 wherein return spring biasing means are provided for normally moving said shutter system back to closed position.

* * * * *